April 27, 1948.　　　　F. G. LEWIS ET AL　　　　2,440,518
ENDLESS TRACK TYPE ROW CROP TRACTOR
Filed May 20, 1946　　　3 Sheets-Sheet 1
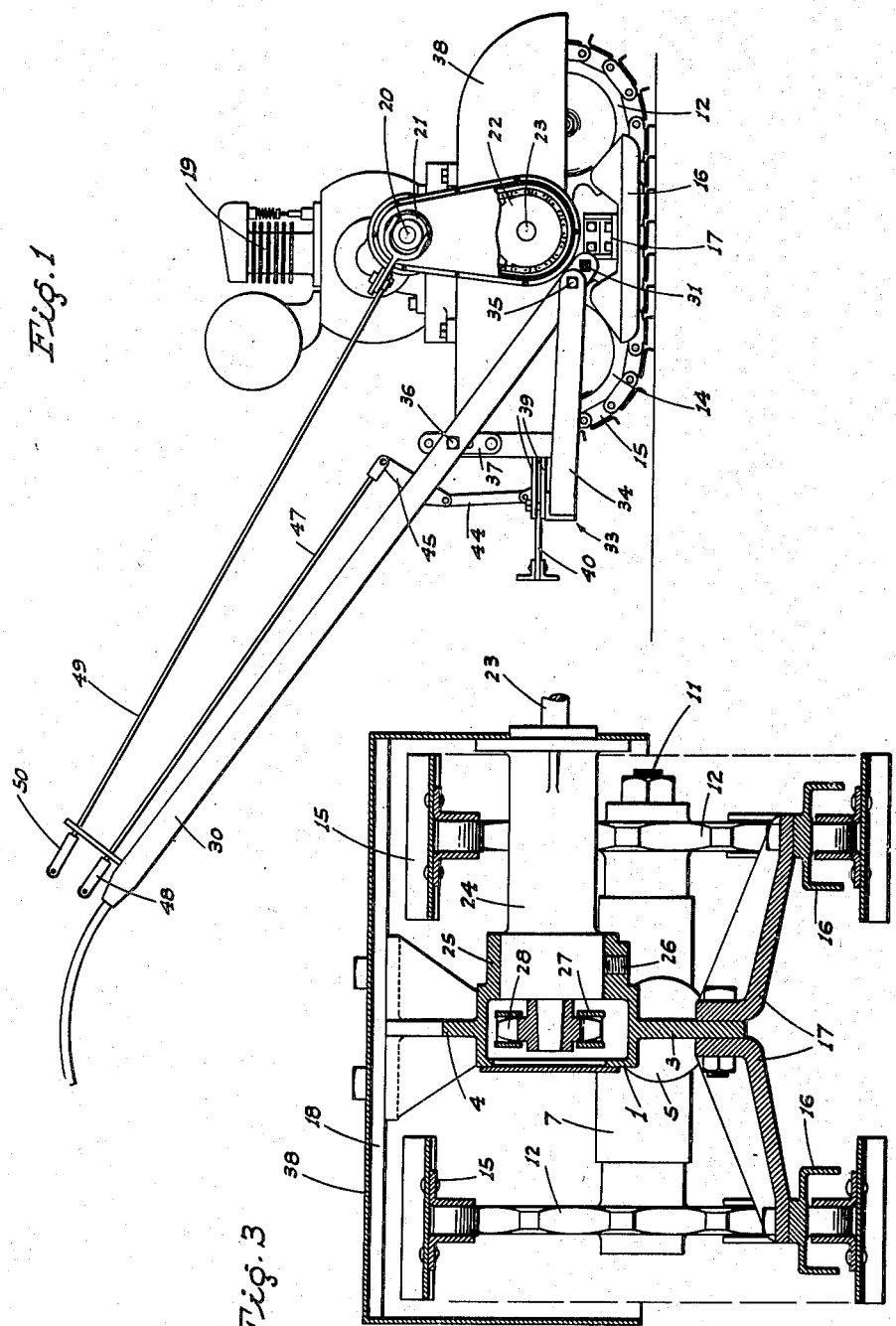
INVENTORS
F. G. Lewis
C. P. Stephen
BY
ATTORNEYS

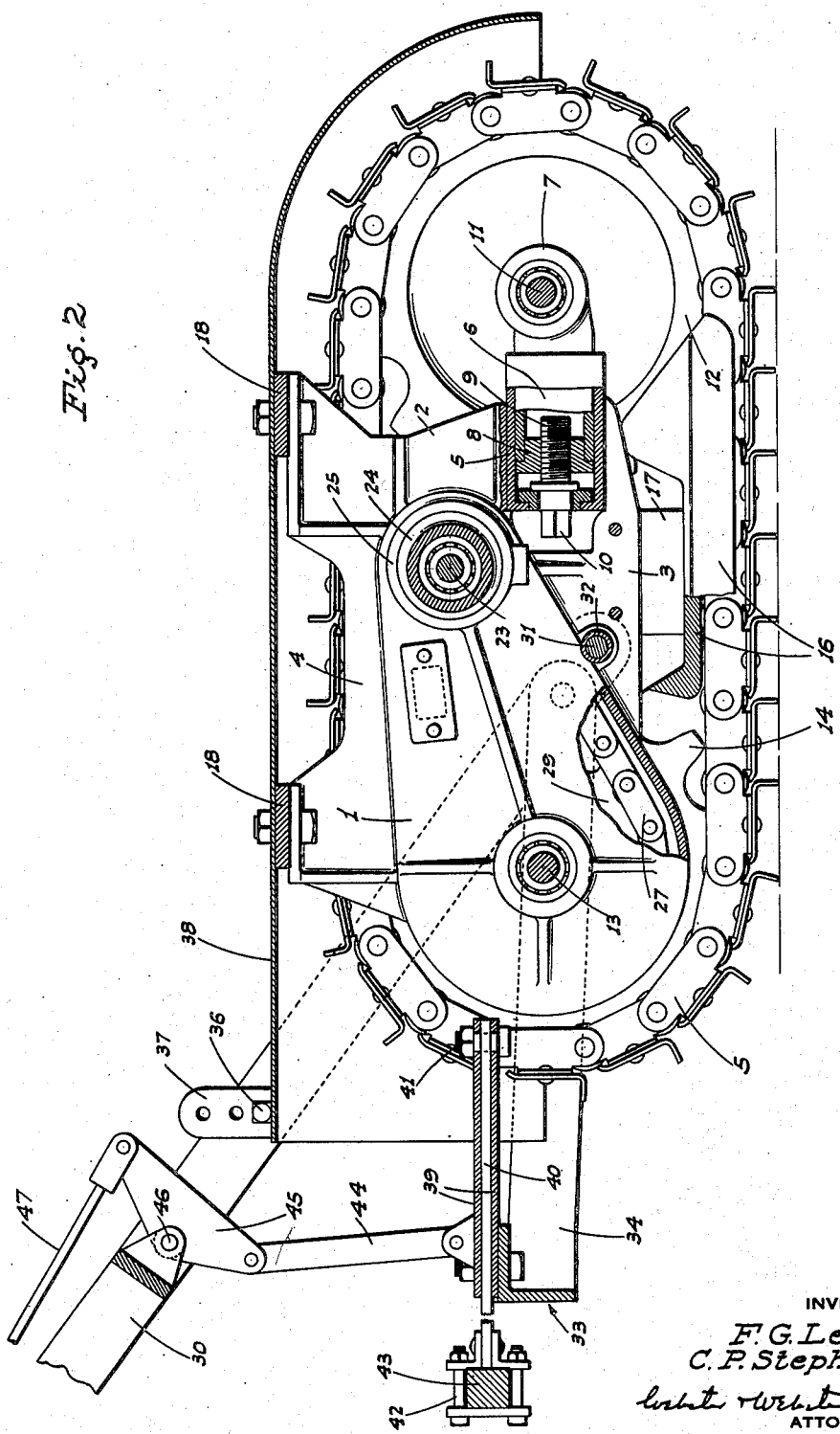

Patented Apr. 27, 1948

2,440,518

UNITED STATES PATENT OFFICE 2,440,518

ENDLESS TRACK TYPE ROW CROP TRACTOR

Frederick G. Lewis and Charles P. Stephen,
Stockton, Calif.

Application May 20, 1946, Serial No. 670,936

13 Claims. (Cl. 180—9.1)

This invention relates in general to an improved garden tractor of the type operated by a person walking behind the implement and controlling the same by handles; the present tractor being especially useful for the cultivation of row crops.

One object of this invention is to provide a crawler tractor, of the above type, which includes a simplified cast frame and a novel drive assembly between the engine and endless tracks which support and propel the implement; the frame and drive assembly being designed so that the tractor has a narrow gauge and is thus capable of running between rather than straddling adjacent crop rows.

Another object of the invention is to provide a novel hitch assembly coupled to the tractor at transversely spaced points well ahead of the rear of the endless tracks whereby to accomplish good tractor balance relative to the control handles, to facilitate steering, and to impart effective draft to the hitch assembly while maintaining a proper substantially horizontal working position of said tractor.

A further object of the invention is to produce a practical row-crop tractor and one which will be exceedingly effective for the purpose for which it is designed.

These objects are accomplished by means of such structure and relative arrangement of parts as will fully appear by a perusal of the following specification and claims:

In the drawings:

Fig. 1 is a side elevation of the tractor.

Fig. 2 is an enlarged longitudinal sectional elevation of the tractor.

Fig. 3 is an enlarged cross section adjacent the center of the tractor and looking forward.

Figure 4:
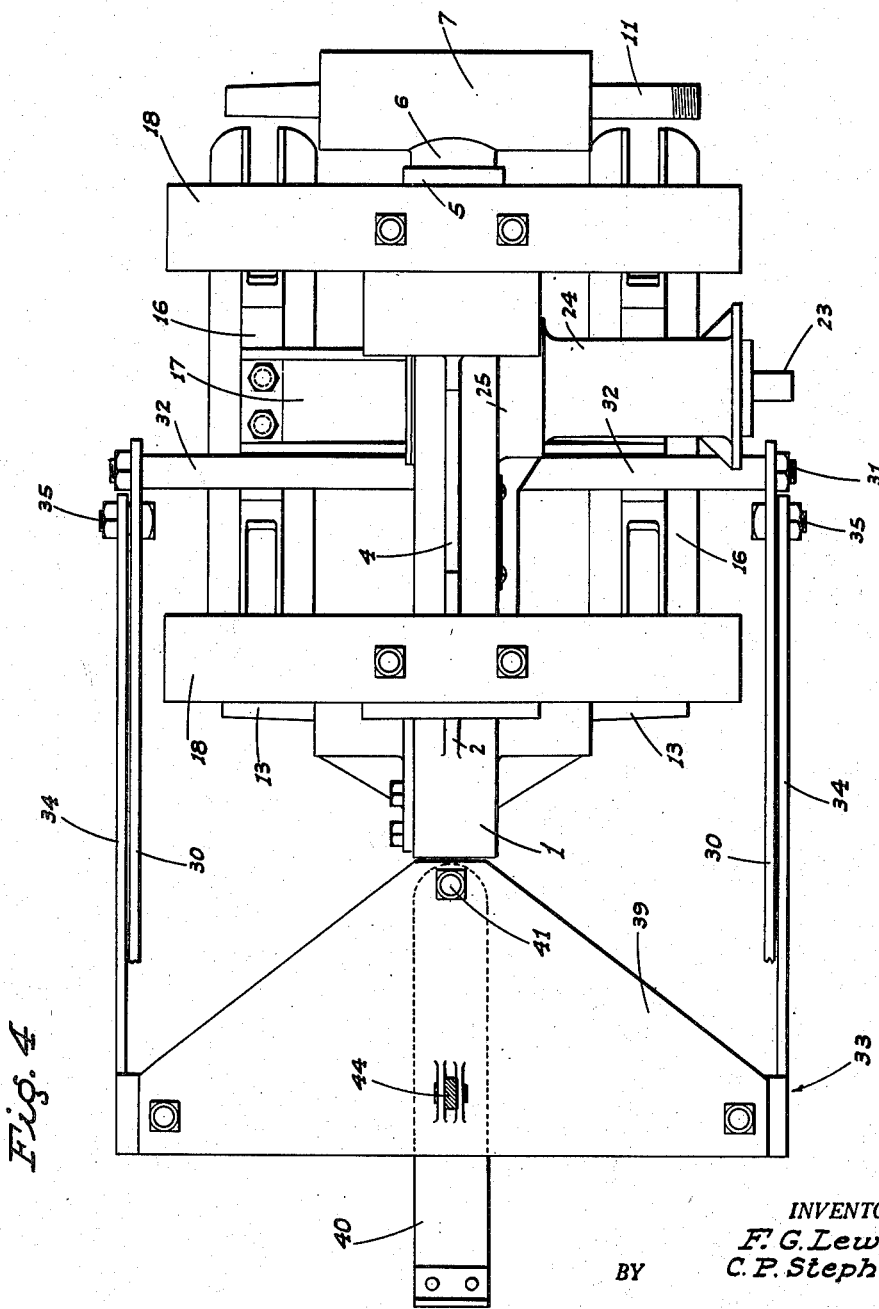
Fig. 4 is an enlarged plan view of the chassis and hitch assembly, detached.

Referring now more particularly to the characters of reference on the drawings, the tractor includes a very simple cast metal frame having a central, upstanding, longitudinally extending gear case 1, one side plate of which is removable for access to the mechanisms contained therein.

The gear case 1 is formed, in integral relation, with a front or forwardly extending web 2, a bottom or downwardly projecting web 3, and a top or upwardly extending web 4.

The front web 2 is formed with a forwardly opening socket 5 in rigid relation, and the intermediate neck or trunnion 6 of a T-head 7 projects into the socket 5 in rockable relation. In the socket 5 the trunnion 6 bears, in turnable relation, against an axially adjustable head 8 threaded on an adjustment screw 9 which extends in rotatable but axially immovable relation through the bottom of the socket 5, whence it is formed with a nut 10 for turning with a wrench.

A front spindle 11 is journaled in and extends through the T-head 7 and projects beyond opposite ends of said T-head. Beyond the opposite ends of the T-head 7 the spindle 11 is fitted with front or idler sprockets 12 of the crawler track assembly.

Adjacent the rear end of the frame or chassis, a transversely extending drive shaft 13 is journaled in and projects beyond opposite sides of the gear case 1, and the opposite end portions of the drive shaft 13 are fixed with the rear or drive sprockets 14 of the crawler track assembly; the sprockets 14 being in direct longitudinal alinement with the idler sprockets 12. Endless crawler tracks 15 extend between corresponding ones of the front and rear sprockets 12 and 14, respectively. The endless crawler tracks 15 are maintained in proper tension by suitable adjustment of the screw 9, whereby to advance or retract the trunnion 6 of T-head 7.

The bottom run of the endless crawler tracks 15 ride in longitudinally extending, inverted guide channels 16 supported, intermediate their ends, by attachment flanges 17 which extend laterally outwardly in opposite directions from the bottom web 3.

The drive for the shaft 13, and consequently the crawler track assembly, comprises the following:

The top web 4 supports, in spacing relation lengthwise of the implement, a pair of transversely extending top plates 18 on which is mounted, in upstanding relation, a gas engine 19 including a drive shaft 20 projecting laterally therefrom; a clutch 21 being interposed in the drive shaft. An endless chain and sprocket 22, enclosed within a suitable guard or shield, extends downwardly from the shaft 20 and drives an intermediate shaft 23. The intermediate shaft 23 extends transversely of the implement and inwardly, in journaled relation, through a sleeve 24 into the forward end of the gear case 1. The sleeve 24 is eccentrically mounted, at its inner end, in a socketed boss 25 on the gear case 1; a set screw 26 maintaining the eccentric sleeve 24 in any position of adjustment. The eccentric mounting of the sleeve 24 is for the purpose of maintaining proper tension on an endless drive chain 27 which extends between a drive sprocket 28 on the inner end of shaft 23, and a relatively larger driven sprocket 29 on the shaft 13 within said case 1.

It will thus be seen that the gas engine 19, driving through the endless chain and sprocket unit 22, intermediate shaft 23, and the endless chain and sprocket in the gear case 1, imparts a positive drive to the shaft 13 and the drive sprockets 14 of the crawler track assembly.

The tractor includes a pair of rearwardly and upwardly extending, transversely spaced control handles 30; said handles being pivotally mounted, at their lower ends, to opposite ends of a rigid cross rod 31 which extends through the chassis of the implement, intermediate the ends thereof, and some distance below the horizontal plane of the spindle 11 and shaft 13, which spindle and shaft are substantially horizontally alined. Spacer sleeves 32, on rod 31, maintain the handles 30 in proper spaced relation on opposite sides of the implement.

A substantially U-shaped draft yoke, indicated generally at 33, straddles the tractor from the rear, and the legs 34 of said yoke are pivotally connected, at its forward ends, as at 35, to the handles 30 immediately adjacent the lower ends of the latter.

Intermediate their ends, but adjacent the tractor, the handles 30 are vertically adjustably secured, as at 36, to adjustment links 37 attached to the rear and opposite side portions of a rigid hood 38 carried by the tractor, and which hood rests on and is affixed to the top plates 18.

The draft yoke 33 includes, at the rear thereof, a pair of vertically spaced, parallel guide plates 39 of general triangular configuration, and a flat tongue 40 laterally swingably projects between the plates 39 to pivotal connection therewith, as at 41. The tongue 40 extends some distance to the rear of the draft yoke 33, and at its rear end said tongue is provided with a clamp unit 42 for the reception of a tool bar 43, from which tool bar the earth working instrumentalities are adapted to depend for ground engagement. The above described pivoted connection of the handles 30 with the chassis of the implement, and the described connection of the draft yoke 33 with the handles places the draft on the yoke at a point substantially along the longitudinal center line of the machine and from a point close to the transverse center line thereof. Thus there is provided a means to effect a positive direct line pull on the tool bar, while maintaining proper balance of the tractor so that the latter will not tend to tilt upward at its forward end when in use.

The draft yoke 33 is vertically adjustable, at the will of the operator, through the medium of a pivoted link 44 which extends upwardly from the top guide plate 39 to connection with a bellcrank 45 pivoted between the handles 30, as at 46. An adjustment rod 47 extends from the upper end of the bellcrank 45 upwardly to a termination with a hand grip 48 adjacent the upper end of the handles 30. The rod 47 is adjustable to various selective positions. Another adjustment rod 49 extends upwardly and rearwardly from the clutch 21, and terminates with a hand grip 50 adjacent the hand grip 48, for control of said clutch.

The above described crawler type garden or row-crop tractor is of exceedingly practical and simplified design, and its construction is such that it requires a minimum of maintenance and repair.

By reason of the particular chassis structure the endless crawler tracks 15 can be disposed on a very narrow gauge; i. e. the spacing therebetween being such that the tractor can run between adjacent crop rows rather than straddling a row.

From the foregoing description it will be readily seen that there has been produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful and upon which Letters Patent are desired:

1. A garden type, handle controlled tractor comprising a chassis having a longitudinally extending case, an engine above and supported by the case, a driven rear shaft extending transversely in journaled relation through the case toward its rear end, and projecting on opposite sides thereof, a transverse front spindle unit, means mounting the front spindle unit in connection with the forward portion of the case, a transversely spaced pair of crawler track assemblies connected between corresponding ends of the rear shaft and front spindle unit on opposite sides of the case, and drive means included in part in the case, between the engine and said shaft; said drive means including an intermediate shaft extending from exteriorly thereof into the case some distance ahead of the rear shaft, driving connections between the engine and intermediate shaft exteriorly of the case, and other driving connections between the intermediate shaft and rear shaft interiorly of the case.

2. A garden type, handle controlled tractor comprising a chassis having a longitudinally extending case, an engine above and supported by the case, a driven rear shaft extending transversely in journaled relation through the case toward its rear end, and projecting on opposite sides thereof, a transverse front spindle unit, means mounting the front spindle unit in connection with the forward portion of the case, a transversely spaced pair of crawler track assemblies connected between corresponding ends of the rear shaft and front spindle unit on opposite sides of the case, and drive means included in part in the case, between the engine and said shaft; said drive means including an intermediate shaft extending from exteriorly thereof into the case some distance ahead of the rear shaft, driving connections between the engine and intermediate shaft exteriorly of the case, and an endless chain and sprocket unit connected between the intermediate shaft and rear shaft interiorly of the case.

3. A tractor as in claim 2 in which said intermediate shaft extends in journaled relation through a transversely extending sleeve, and means mounting the sleeve at one end on the case in a manner to provide adjustment of said sleeve lengthwise of the tractor so as to properly tension said endless chain and sprocket unit in the case.

4. A tractor as in claim 2 in which said intermediate shaft extends in journaled relation through a transversely extending sleeve, and means mounting the sleeve at one end on the case in a manner to provide adjustment of said sleeve lengthwise of the tractor so as to properly tension said endless chain and sprocket unit in the case; said means including an eccentric support for the sleeve.

5. A garden type, handle controlled tractor comprising a chassis having a longitudinally extending case, an engine above and supported by the case, a driven rear shaft extending transversely in journaled relation through the case toward its rear end, and projecting on opposite sides thereof, a transverse front spindle unit, means mounting the front spindle unit in connection with the forward portion of the case, a transversely spaced pair of crawler track assemblies connected between corresponding ends of the rear shaft and front spindle unit on opposite sides of the case, and drive means included in part in the case, between the engine and said shaft; said drive means including an intermediate shaft extending from exteriorly thereof into the case some distance ahead of the rear shaft, driving connections between the engine and intermediate shaft exteriorly of the case, and other driving connections between the intermediate shaft and rear shaft interiorly of the case, the driving connections between the engine and intermediate shaft comprising an endless chain and sprocket unit disposed to one side of the case.

6. A garden type, handle controlled tractor comprising a chassis having a longitudinally extending case, an engine above and supported by the case, a driven rear shaft extending transversely in journaled relation through the case toward its rear end, and projecting on opposite sides thereof, a transverse front spindle unit, means mounting the front spindle unit in connection with the forward portion of the case, a transversely spaced pair of crawler track assemblies connected between corresponding ends of the rear shaft and front spindle unit on opposite sides of the case, and drive means included in part in the case, between the engine and said shaft; the front spindle unit including a T head having a rearwardly extending central trunnion, and said spindle unit mounting means comprising a forwardly opening socket rigid with the case, the trunnion rockably engaging in the socket, and means to adjust the axial position of the trunnion in the socket.

7. A garden type, handle controlled tractor comprising a chassis having a longitudinally extending case, an engine above and supported by the case, a driven rear shaft extending transversely in journaled relation through the case toward its rear end, and projecting on opposite sides thereof, a transverse front spindle unit, means mounting the front spindle unit in connection with the forward portion of the case, a transversely spaced pair of crawler track assemblies connected between corresponding ends of the rear shaft and front spindle unit on opposite sides of the case, and drive means included in part in the case, between the engine and said shaft; the front spindle unit including a T head having a rearwardly extending central trunnion, and said spindle unit mounting means comprising a forwardly opening socket rigid with the case, the trunnion rockably engaging in the socket, and an adjustment screw rotatably but axially immovably extending through the bottom of the socket, said screw having means thereon turnably engaging the inner end of the trunnion.

8. A garden type, handle controlled tractor comprising a chassis having a longitudinally extending case, a longitudinal top web and a longitudinal bottom web formed thereon, an engine above and supported by the top web, a driven rear shaft extending transversely in journaled relation through the case toward its rear end, and projecting on opposite sides thereof, a transverse front spindle unit, means mounting the front spindle unit in connection with the forward portion of the case, a transversely spaced pair of crawler track assemblies connected between corresponding ends of the rear shaft and front spindle unit on opposite sides of the case, drive means included in part in the case, between the engine and said shaft; longitudinal guide members above and cooperating with the lower runs of the crawler tracks, and means rigidly mounting the guide members in connection with the bottom web.

9. A garden type, handle controlled tractor comprising a chassis having a longitudinally extending case, a longitudinal top web and a longitudinal bottom web formed thereon, an engine above and supported by the top web, a driven rear shaft extending transversely in journaled relation through the case toward its rear end, and projecting on opposite sides thereof, a transverse front spindle unit, means mounting the front spindle unit in connection with the forward portion of the case, a transversely spaced pair of crawler track assemblies connected between corresponding ends of the rear shaft and front spindle unit on opposite sides of the case, drive means included in part in the case, between the engine and said shaft; longitudinal guide members above and cooperating with the lower runs of the crawler tracks, and means rigidly mounting the guide members in connection with the bottom web; said last named means comprising a pair of attachment flanges secured to and projecting in opposite lateral directions, at a downward slope, from the bottom web.

10. A garden type, handle controlled tractor comprising a chassis having a longitudinally extending case and a longitudinal top web, transverse supporting members secured in rigid connection with the top web at longitudinally spaced points, an engine mounted on and supported by said transverse members, a driven rear shaft extending transversely in journaled relation through the case toward its rear end and projecting on opposite sides thereof, a transverse front spindle unit, means mounting the front spindle unit in connection with the forward portion of the case, a transversely spaced pair of crawler track assemblies connected between corresponding ends of the rear shaft and front spindle unit on opposite sides of the case, and drive means included in part in the case, between the engine and said shaft.

11. A garden type, handle controlled tractor comprising a chassis having a longitudinally extending case, an engine above and supported by the case, a front web on and projecting forwardly from the case, a driven rear shaft extending transversely in journaled relation through the case toward its rear end and projecting on opposite sides thereof, a transverse front spindle unit, means mounting the front spindle unit in connection with the front web on the case, a transversely spaced pair of crawler track assemblies connected between corresponding ends of the rear shaft and front spindle unit on opposite sides of the case, and drive means included in part in the case, between the engine and said shaft.

12. A tractor as in claim 11 in which the spindle mounting means includes a trunnion supporting the spindle, and a forwardly opening socket on said front web receiving the trunnion in rockable relation.

13. A garden type, handle controlled tractor comprising a chassis having a longitudinally extending case, said case including front, top, and bottom longitudinal webs projecting therefrom, a transversely extending front spindle, means journaling the front spindle in connection with the front web, a rear drive shaft journaled in connection with and extending through the case toward the rear end, front and rear sprockets on opposite ends of the spindle and drive shaft, endless tracks extending between corresponding front and rear sprockets, an engine mounted in connection with and supported by the top web, drive means included in part in the case, connected between the engine and said rear shaft in driving relation to the latter, and longitudinal guide members supported from the bottom web and cooperating with the lower runs of the endless tracks.

FREDERICK G. LEWIS.
CHARLES P. STEPHEN.

REFERENCES CITED

The following references are of record in the file of this patent:

UNITED STATES PATENTS

| Number | Name | Date |
| --- | --- | --- |
| 1,302,317 | Cowan | Apr. 29, 1919 |
| 1,353,318 | Cowan | Sept. 21, 1920 |
| 1,401,625 | Mader | Dec. 27, 1921 |
| 1,402,186 | Stahl | Jan. 3, 1922 |